United States Patent [19]
Carlson

[11] Patent Number: 6,121,765
[45] Date of Patent: *Sep. 19, 2000

[54] ISOLATED ELECTRICAL POWER SUPPLY

[75] Inventor: Curt S. Carlson, Green Oaks, Ill.

[73] Assignee: Charlotte A. Andres, Lake Villa, Ill.

[*] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/971,987

[22] Filed: Nov. 17, 1997

Related U.S. Application Data

[63] Continuation of application No. 08/571,331, Dec. 13, 1995, Pat. No. 5,689,180.

[51] Int. Cl.[7] ............................. H01F 40/04; H02H 9/04; H02M 3/22
[52] U.S. Cl. ............................. 323/359; 363/59; 361/42; 361/111
[58] Field of Search ............................. 361/42, 43, 111; 363/56; 323/359; 307/150

[56] References Cited

U.S. PATENT DOCUMENTS

| | | | |
|---|---|---|---|
| 3,963,975 | 6/1976 | Gauper, Jr. et al. | 363/15 |
| 4,882,646 | 11/1989 | Genuit | 361/42 |
| 5,448,443 | 9/1995 | Muelleman | 361/111 |
| 5,689,180 | 11/1997 | Carlson | 323/359 |

*Primary Examiner*—Adolf Deneke Berhane
*Attorney, Agent, or Firm*—Robert L. Knechtel

[57] ABSTRACT

A isolated power supply for protecting electrical devices from transient voltages and currents is disclosed. Specifically, the filter has a toroid and resistor which are used in conjunction with an isolator transformer. The transformer's secondary windings are coupled to the electrical load sought to be isolated. The primary windings of the transformer are tied to an alternating current source with an earth ground lead. The primary shield lead of the transformer is tied to the earth ground lead. The secondary shield lead of the transformer is also tied to the earth ground. A toroid inductor and resistor in parallel are coupled between the secondary neutral lead and the secondary ground lead to shunt off current or voltage spikes. The earth ground is part of a chassis which prevents spark jump insuring the isolation of the power source. The isolator thus provides equal voltage potential between the secondary lead and the primary earth ground at frequencies of less than 1 kHz.

16 Claims, 5 Drawing Sheets

ISOLATED ELECTRICAL POWER SUPPLY

This is a continuation of Ser. No. 08/571,331 filed Dec. 13, 1995, now U.S. Pat. No. 5,689,180.

FIELD OF INVENTION

The present invention relates to isolating and suppressing transient electrical pulses and high frequency interference in power systems. More specifically, the present invention is directed to a ground noise suppressor which attenuates undesirable transient voltage pulses, fault currents and high frequency interference with an inductor placed after the secondary winding of an isolation transformer.

BACKGROUND OF INVENTION

In many electrical applications, uninterrupted power free from transient currents, voltages, and other forms of electrical noise are required. Those undesirable pulses and noise may be generated by outside disturbances such as lightning, motor generators, electrically driven devices etc., which originate within a facility from other loads interacting with each other or interconnected via the electrical distribution or data cables. There is thus a need for suppression of unwanted electrical noise and isolating transient pulses from any external power source. Additionally, there are fault voltages which may be generated within an electrical device. For example, in computer systems, a large majority of data loss or system problems result from poor grounding of power supplies. These problems are compounded with increased gate densities on integrated circuits.

Electrical contamination of only half a volt may cause data errors in present computer systems. With digital logic referencing ground at all times, it is imperative that a zero reference free of transient voltages or currents or noise be provided on the ground plane. Electrical impulses of greater magnitude are even more damaging because they may degrade a computer system's performance by eating away at the silicon underlying integrated circuits causing pitting on the surface. This in turn eventually degrades or destroys integrated circuit operation leading to complete data and system loss.

A typical grounding system has multiple functions which include personnel safety, serving as a steady zero electronic volt reference, lightning protection and a path for fault current. There are several established standards for proper grounding and proper alternating current (AC) distribution. Those include UL, ANSI C62.41, and IEEE 587 standards and National Electrical Codes, all of which must be met for normal applications. Additionally per UL, power isolators must have a practical limit to withstand at least 6000 volts to compensate for conductor spacing of typical electrical wiring systems. Traditionally, surge suppressors have been used to nullify (limit) transient voltages. Unfortunately such devices convert surge voltages to undesirable surge currents on the system data ground.

One method of eliminating unwanted transient voltages uses an isolated power supply. Typically this is accomplished by an isolation transformer. The transformer's primary windings are connected to an external alternating current (AC) voltage source. The electrical load sought to be protected is connected to the secondary windings and thus is electrically isolated from the AC voltage source and any transients from the external source. Although this arrangement eliminates some transients other current and voltage surges such as ground fault current may still occur in the secondary winding and thus be passed to the load.

Additionally, as the primary and secondary grounds are electrically tied to the same "ground plane," there is no way to stop unwanted noise from choosing any path it wishes to the "protected" load on the secondary winding or to the primary winding.

Another method of shunting transient pulses involves tying an impedance to the primary ground input of a transformer. In this configuration both the primary and secondary windings of the transformer have a source (line power), neutral and ground tap. The secondary ground tap is connected to the primary ground tap and is tied to an external ground through the impedance. The impedance thus shunts transient high frequency current away from the input voltage lines of the electrical load connected to the secondary windings but allows 60 Hz AC voltage to pass through the transformer windings. The impedance is typically a toroid having a number of windings around a cylindrical core.

The toroid's maximum impedance is limited due to the diameter of the core. Additionally, the wire thickness necessary for high frequency applications limits the number of turns on the toroid. Coupling the toroid on the transformer's primary windings leaves a potential difference between the earth ground, chassis ground, isolated ground and the neutral ground of the load. Thus, because of the toroid's size, UL regulations limit the isolating power source using this method to 5 amps. Additionally, UL regulations require double insulation, such as a layer of heat shrink, air space and/or electrical insulating paper, on all the wires of the isolator device, isolator components, and the load itself for safety reasons. Such requirements for isolator devices are understandably difficult to meet and limit performance. In addition, external ground wires must be tied to the earth ground or isolated ground if not double insulated. Thus, isolated grounds with this type of deices still presents a challenge to maintaining the zero reference for high current, high voltage loads.

Accordingly there is a need for an isolated power supply that provides a true ground free from a wide range of transient voltages, currents and high frequency interference. There is also a need for a power isolator which meets safety standards for larger power sources over 5 amps. Additionally, there is a need for a power isolator which does not require double insulation on all electrical surfaces or connected loads.

SUMMARY OF THE INVENTION

The above needs are met by an isolated power supply in accordance with the present invention for suppressing fault currents and noise from an external three-wire alternating current power source having an earth ground. The present invention isolates the alternating current power source and ground which powers the electrical load and provides a signal reference ground. The isolated power supply has an isolation transformer with a primary and a secondary winding. Each of the windings has respective source, neutral, and shield leads. The primary and secondary windings are magnetically coupled but are isolated from direct electrical connection to each other.

The primary leads are electrically coupled to the alternating current power source. The secondary leads are electrically coupled to the electrical load. Thus the isolation transformer magnetically isolates the electrical load from the alternating current power source. The secondary shield lead and the primary shield lead are electrically coupled together as an earth ground. An inductor is electrically coupled between the secondary neutral lead and the earth ground providing electrical isolation between the earth ground and the secondary neutral lead.

Numerous other aspects and advantages of the present invention will become apparent from the following drawings and detailed description of the invention and its preferred embodiments.

BRIEF DESCRIPTION OF THE DRAWINGS

The present invention may be better understood with reference to the detailed description in conjunction with the following figures where like numerals denote identical elements, and in which.

DETAILED DESCRIPTION OF THE PREFERRED EMBODIMENT

Figure 1:
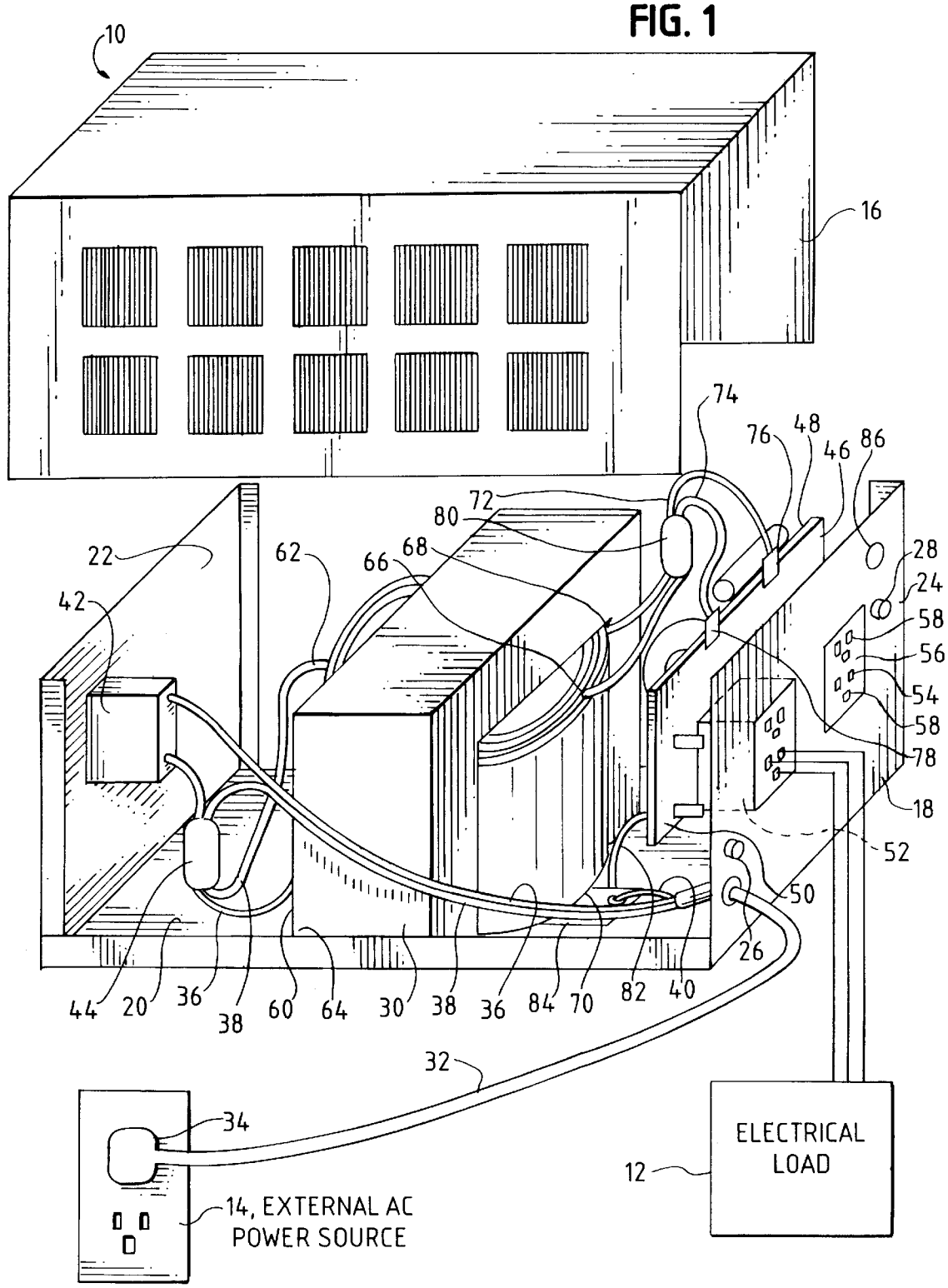
FIG. 1 is a perspective view of the power isolator of the present invention.

FIG. 1 is a perspective view of a power isolator 10, according to the present invention. The power isolator 10 provides electrical isolation for an electrical load 12, from an external AC power source 14. The external AC power source has a source lead, a neutral lead, and an earth ground lead. The isolator 10 provides a primary earth ground potential while electrically isolating the load 12. In the preferred embodiment, the isolator 10 is capable of isolating an alternating current power source of 8.3 amps at 120 volts. Of course, other voltage and current levels may be isolated using the present invention. For example, the present invention may be modified for operation with power sources having a current in the range of 0.5–225 amps at 120 volts. Additionally, other voltages at different phases may also be isolated using the present invention.

The isolator 10 has a metal cover 16 which is normally installed on a metal chassis 18 for protecting the internal components. Screws (not shown) or other fastening devices are used to attach the cover 16 to the chassis 18. The chassis 18 has a bottom plate 20, and a pair of sidewalls 22 and 24. An isolation transformer 30 is mounted on the bottom plate 20. As will be explained below, the isolation transformer 30 prevents direct voltage flow to the electrical load 12 connected to the isolator 10, thus isolating the alternating current (AC) power source 14. The electrical load 12 may be any electrical device such as a computer, electrically sensitive appliance or data storage device which requires an isolated ground protected from transient currents and voltages for proper operation.

The external alternating current source 14 is typically connected to the isolator 10 by a power cord 32. The power cord 32 may be connected to the alternating current source 14 by a three pronged plug 34. Alternatively, the power cord 32 and the plug 34 may be replaced with a hard wire connector. The power cord 32 has a source line 36, a neutral line 38, and a ground line 40. An input/earth ground stud 26 is coupled to the chassis 18 on the sidewall 24. The stud 26 serves as an external connector to reference earth ground. An isolated binding post 28 is also attached to the sidewall 24. The isolated binding post 28 is tied to the conditioned ground as will be explained below.

A circuit breaker/fuse switch 42 is mounted on the sidewall 22. The circuit breaker/fuse switch 42 allows a user to turn on and off the isolator 10 by interrupting the electrical flow on the source line 36. Additionally, the circuit breaker/fuse switch 42 will interrupt the source line 36 thus cutting off power to the electrical load 12 on detecting an abnormal fault current. The source line 36 and the neutral line 38 are twisted together and wrapped by a ferrite bead 44 before being connected to the transformer 30.

An isolation power circuit board 46 is mounted in the chassis 18 and is physically separated from the isolation transformer 30. The isolation power circuit board 46 has a component surface 48 which faces the isolation transformer 30. The isolation power circuit board 46 also has a connector surface 50 which faces the sidewall 24. Two isolated ground connector/terminal boxes 52 and 54 are mounted between the connector surface 50 of the isolation ground board 46 and the sidewall 24. The isolated ground connector boxes 52 and 54 are offset from the surface of the isolation circuit board 46 to prevent an antenna effect such as EMF or RF waves from the transformer 30. The isolated ground connector boxes 52 and 54 also support the isolation circuit board 46 on the sidewall 24. As will be explained, the connector boxes 52 and 54 are electrically isolated from the external current source 14.

Each of the connector boxes 52 and 54 have a socket plate 56 which is flush against the sidewall 24. The socket plate 56 has two standard three hole sockets 58 which serve as power connection sources for electrical devices such as the electrical load 12. In the preferred embodiment, the socket plates 56 are colored orange indicating an isolated ground power supply. Each of the sockets 58 of the outlets 52 and 54 have a source socket, a neutral socket and a ground socket which are a straight blade type socket. Different sockets such as a twist lock or terminal strips may be used instead of the straight blade type for higher current isolation devices.

The transformer 30 has a primary source lead 60, a primary neutral lead 62 and a primary electrostatic shield lead 64. The primary source lead 60 is connected to the source line 36 while the primary neutral lead 62 is connected to the neutral line 38. The transformer 30 also has a secondary source lead 66, a secondary neutral lead 68, and a secondary electrostatic shield lead 70. A source line 72 connects the secondary source lead 66 to a source tab 76 mounted on the isolation ground board 46. A neutral line 74 connects the secondary neutral lead 68 to a neutral tab 78 mounted on the isolation ground board 46. The source line 72 and the neutral line 74 are twisted together and wrapped by a ferrite bead 80.

The isolation ground board 46 is connected to one end of an insulated ground wire 82. The other end of the ground wire 82 and one end of the ground line 40 are connected to a copper strip 84 which is in electrical contact with the bottom plate 20 of the chassis 18. The primary electrostatic shield lead 64 as well as the secondary electrostatic shield lead 70 are also connected to the copper strip 84. The copper strip 84 is a relatively wide band for better high frequency voltage flow. The copper strip 84 in conjunction with the chassis 18 serves as an earth ground. A light emitting diode (LED) 86 is mounted on the sidewall 24. The LED 86 indicates whether power is flowing to the connector boxes 52 and 54.

Figure 2:
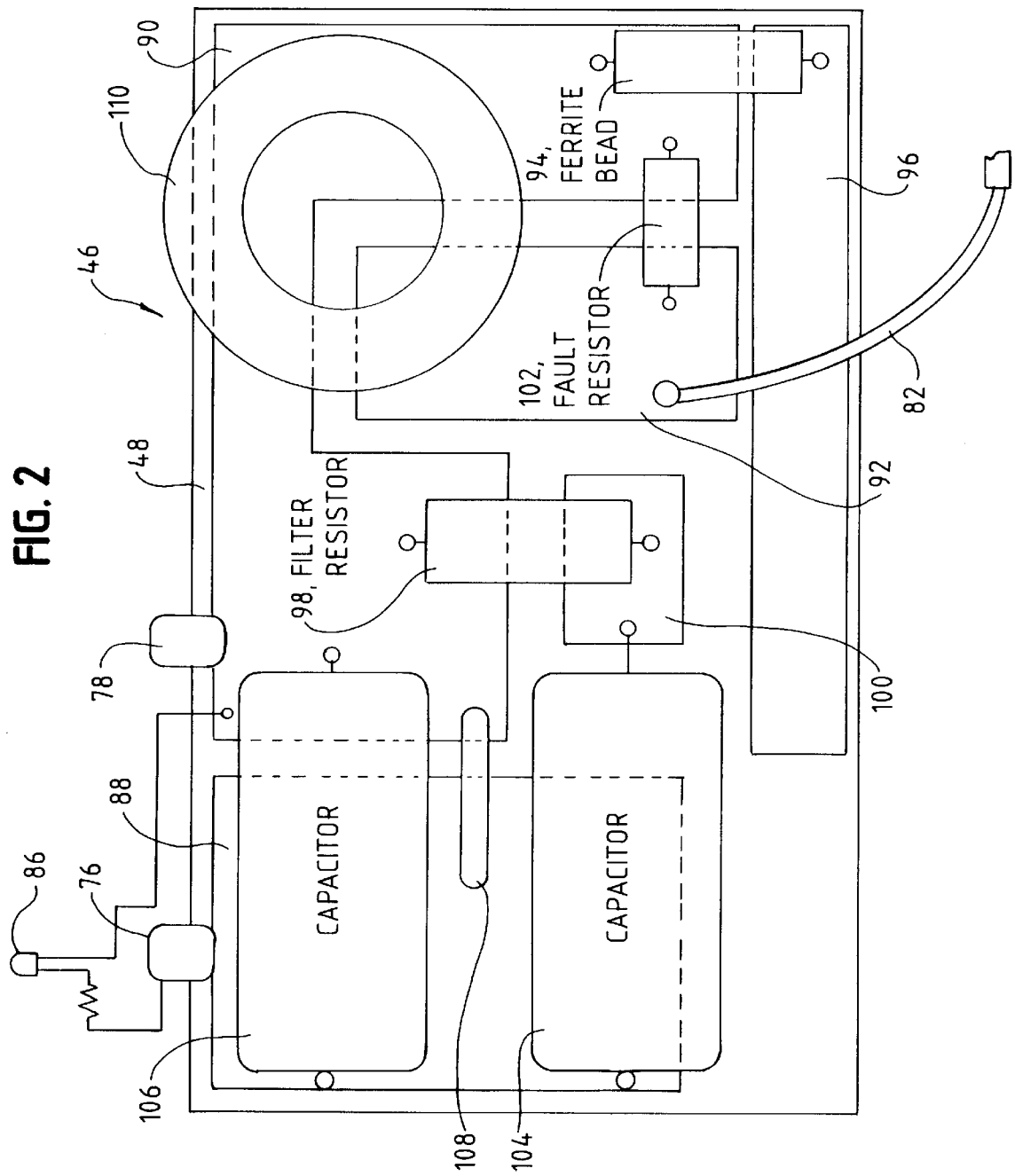
FIG. 2 is a front view of the isolation ground circuit board of the present invention.
Figure 3:
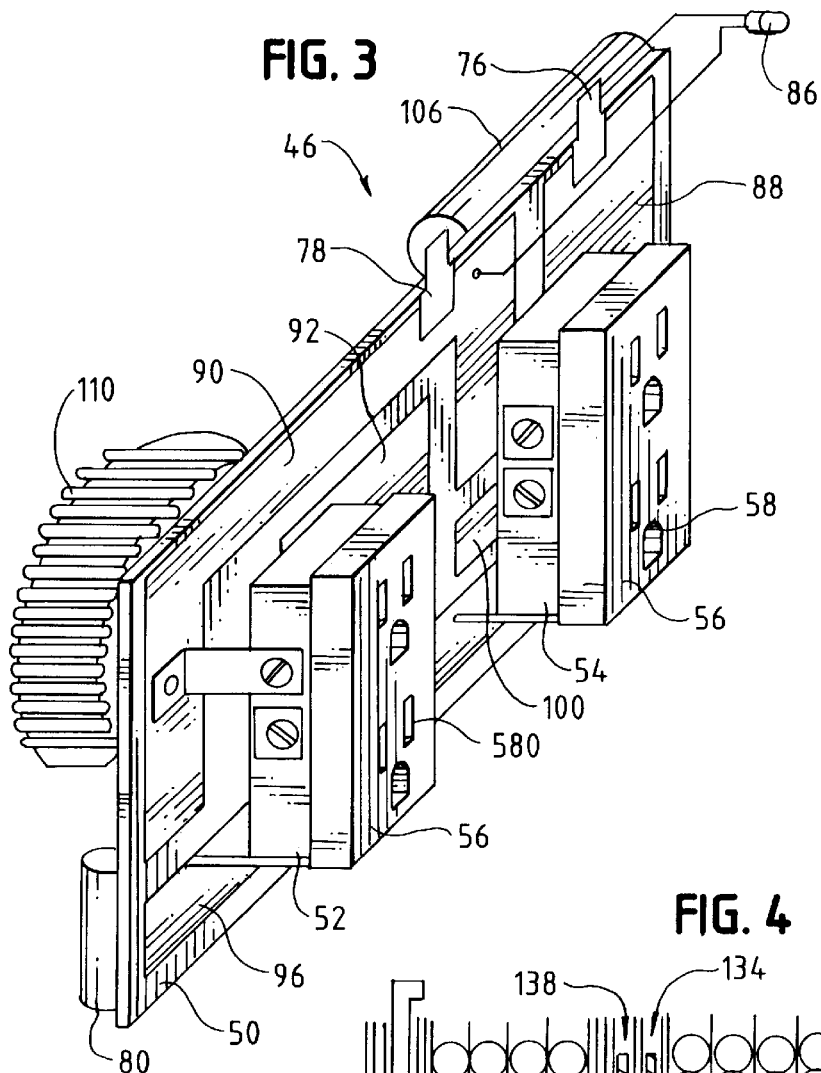
FIG. 3 is a perspective view of the isolation ground circuit board of the present invention.

FIG. 2 shows a front view of the component surface 48 of the isolation ground circuit board 46. FIG. 3 shows a perspective view of the connector surface 50 of ground circuit board 46. With reference to FIGS. 2 and 3, the source line 72 is connected to the source tab 76, while the neutral line 74 is connected to the neutral tab 78. The source tab 76 is electrically connected to a source plate 88 which is in turn electrically connected to the source sockets of the sockets 58 of the connector boxes 52 and 54. The neutral tab 78 is electrically connected a neutral plate 90 which is in turn electrically connected to the neutral sockets of the sockets 58 of the connector boxes 52 and 54. The LED 86 is connected to the source line 72 through a dropping resistor. The insulated ground wire 82 is connected to a ground plate 92.

A ferrite bead 94 surrounds a wire connecter which electrically connects the neutral plate 90 to a ground strip 96. One lead of a filter resistor 98, which is preferably 5 watts in the preferred embodiment, is coupled to a connection pad 100. The other lead of the filter resistor 98 is electrically coupled to the neutral plate 90. One lead of a fault resistor 102, which is preferably 5 watts in the preferred embodiment, is electrically connected to the ground plate 92. The other lead of the fault resistor 102 is electrically connected to the neutral plate 90.

Two capacitors 104 and 106 are also mounted on the isolation ground board 46 for filtering high frequency pulses. One lead of each of the capacitors 104 and 106 is electrically coupled to the source plate 88. The other lead of the capacitor 104 is electrically coupled to the resistor 98 via the contact plate 100. The other lead of the capacitor 106 is electrically coupled to the neutral plate 90. A metal oxide varistor (MOV) 108 is mounted on the isolation ground board 46 for high voltage clamping. One lead of the MOV 108 is coupled to the source plate 88 while the other lead is coupled to the neutral plate 90. One lead of an inductor such as a toroid 110 is electrically coupled to the secondary neutral lead 68 of the isolation transformer 30 via the neutral plate 90. The other lead of the toroid 110 is electrically coupled to the ground plate 92.

The toroid 110 has a cylindrical core which is typically 1–6 inches in diameter. The diameter of the toroid 110 depends on the magnitude of the source current to be isolated. The toroid core is a magnetic material such as iron and ferrite which is overwrapped with epoxy. A number of copper wire turns are wound around the core. In the preferred embodiment the wire size and number of windings is determined by the National Electrical Code Requirement for fault current flow for varying ampacities at 60 Hz. Of course other windings, wire sizes, and core sizes may be used with the present invention.

The above described components mounted on the isolation circuit board 46 serve the function of attenuating transient high voltages and shunting fault current over a wide range of frequencies. In the preferred embodiment, the leads of the electrical components on the isolation circuit board 46 have mating holes in their respective plates. The leads are placed in the mating holes and soldered in place to insure maximum electrical contact and to minimize the risk of spark jump.

The plates 88–92, strip 96, and pad 100 in the preferred embodiment are made of single sided FR-4 2.0 oz. tinned copper. The plates 88–92, strip 96, and pad 100 are all embedded within the circuit board 46 to minimize risk of electrical shocks. The only exposed metal contacts are connected to the electrical components. The plates 88–92, strip 96, and pad 100 have a relatively large surface area for high frequency, high current flow displacement. Spacing is maintained between the plates 88–92, strip 96, and pad 100 to comply with UL safety requirements to prevent voltage arcing between them.

Figure 4:
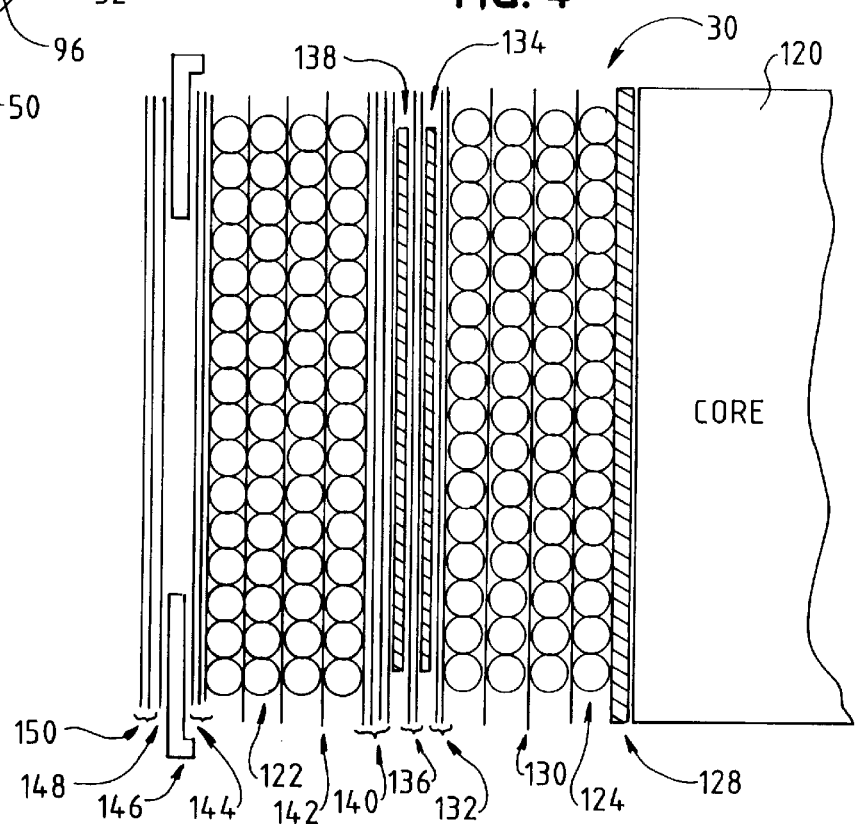
FIG. 4 is a cutaway view of one of the transformer designs of the present invention.

FIG. 4 is a cutaway view of the isolation transformer 30. The transformer is centered around a ferro-magnetic core 120. The core 120 is surrounded by a primary winding 122 and a secondary winding 124. In the preferred embodiment, the windings of the primary winding 122 and the secondary winding 124 are in a 1:1 ratio. Of course, other winding ratios may be used in conjunction with the present invention. Additionally, other transformer types such as ferroseonant transformers may also use the present invention.

The secondary winding 124 separated from the core 120 by a tube 128. Each of the secondary winding layers are separated from each other by a secondary layer insulation sheet 130. In the preferred embodiment this sheet is made of Nomex but any other electrically insulating material may be used. The secondary winding 124 is also separated from the remainder of the transformer 30 via a secondary wrap insulation 132, which is also preferably constructed of Nomex. A secondary shield 134 serves to insulate the secondary winding 124 from high frequency noise. The secondary shield 134 is made of copper in the preferred embodiment. A primary/secondary shield insulator 136 serves to separate the secondary shield 134 from other electrical windings. The insulator 136 is preferably made of Nomex in the present invention. A copper primary shield 138 borders the secondary shield 134 and is separated by a primary insulation layer 140 which is also made of Nomex.

Both the primary shield 138 and the secondary shield 134 are connected to the copper strip 84 via the primary and secondary electrostatic shield leads 64 and 70 which in combination with the chassis 18 serves as an earth ground. Each of the primary windings 122 are separated by a primary layer insulation sheet 142 which is also preferably made of Nomex. The entire primary winding 122 is surrounded by a Nomex primary wrap 144. The transformer has a lead tab 146 which is insulated on the outside of the transformer 30 by an insulation layer 148. Finally, the entire transformer 30 is wrapped with a glass tape layer 150.

Figure 5:
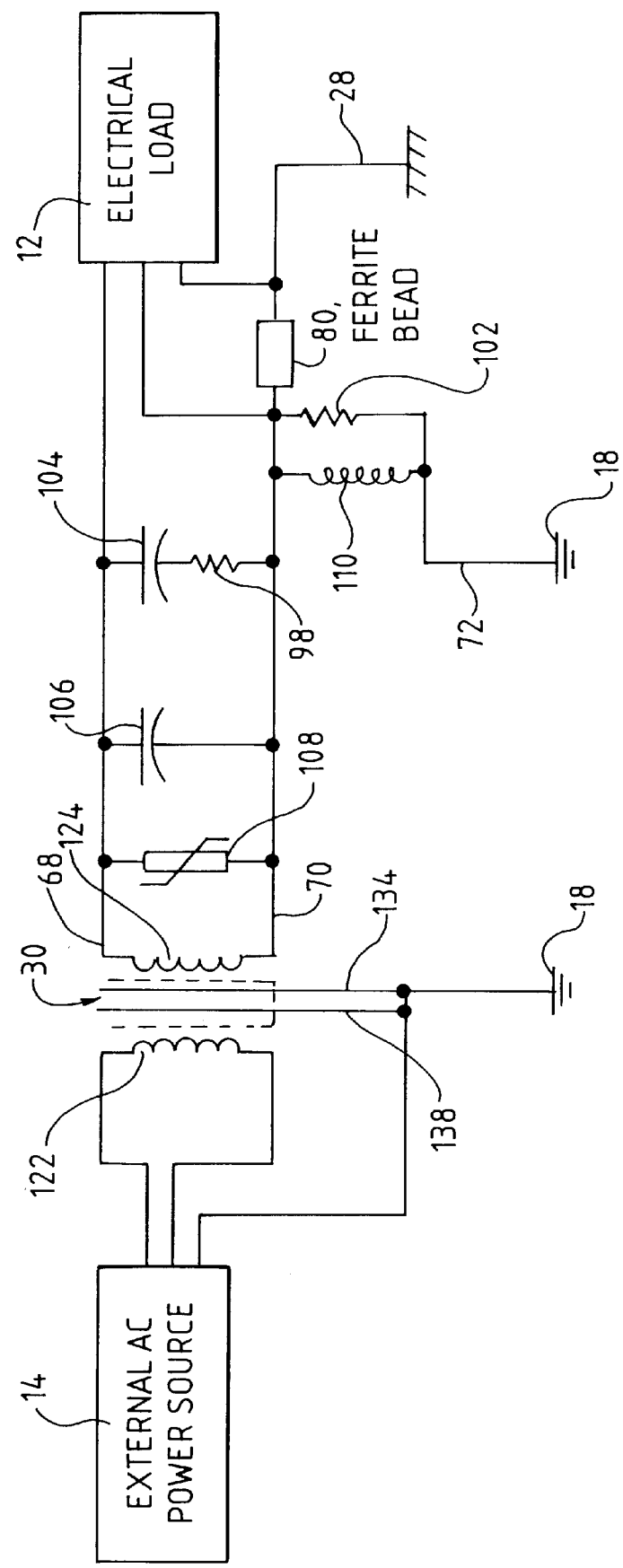
FIG. 5 is a circuit diagram of the isolation circuit of the present invention.

FIG. 5 is a circuit diagram incorporating the elements showing the isolation circuit board 46. The isolation transformer 30 is double shielded and has low impedance which isolates noise from the electrical load 12 which is connected via the connector box 52 to the secondary leads of the secondary winding 124. The isolation transformer 30 serves to isolate noise by providing a low impedance path for fault current flow. As described above, the primary shield 138 and the secondary shield 134 are connected to the chassis 18 via the copper strip 84 which serves as a primary earth ground.

The electrical source from the leads 66, 68, and 70 of the secondary winding 124 of the isolation transformer 30 are further filtered with the components mounted on the component surface 48 of the ground isolation board 46. These components are separated from the isolation transformer 30 for greater isolation from transient electrical pulses.

The metal oxide varistor (MOV) 108 is tied between the secondary source lead 66 and the secondary neutral lead 68 of the isolation transformer 30. The MOV 108 serves to clamp any high voltage which could couple through the transformer 30 to the electrical load 12. Similarly, the capacitor 106 is tied between the secondary source lead 66 and the neutral lead 68 of the isolation transformer 30.

The capacitor 106 is designed to attenuate pulses in the 100 kHz range which clamps ANSI/IEEE pulses. The resistor 98 is placed in series with the capacitor 104 to attenuate any ringing sine waves or voltage waves which are coupled through the isolation transformer 30 from an ANSI/IEEE pulse.

The resistor 102 is wired in parallel with the toroid 110 and connected to the ferrite bead 80. The ferrite bead 80, resistor 102 and toroid 110 are a ground filter circuit. Fault currents generated from the load 12 are attenuated through the transformer 30 and the earth ground (the chassis 18). The ground filter circuit attenuates high frequency voltage and current. Fault current passes back straight through the primary winding 122 of the isolation transformer 30 and also to the earth ground since the impedances on both are similar. The diversion of the fault current protects the neutral lead 68 connected to electrical load 12. The ferrite bead 80 is designed to filter current in the 70–200 kHz range. Thus, current in this range is filtered before it reaches the transformer 30.

The toroid 110 causes the secondary electrostatic shield lead 70 at the output of the filtering circuit to be isolated such that only the electrical load coupled to the connector box 54 will be conditioned. Thus, no double insulation is necessary for the toroid 110 and the resistor 102. The chassis 18 provides a wide conductor for attenuating high frequency current. Low frequency current such as that under 1 kHz is passed through by the toroid 110. All of the components tied to secondary leads of the transformer 30 provide less than 0.5 ohm resistance at low frequencies of less than 1 KHz such as 60 Hz household current. Thus, low frequency current and voltage are permitted to pass. At these low frequencies, there is no voltage potential between the secondary neutral load 68 and the secondary electrostatic shield lead 70 as both are tied to the earth ground. Thus, the electrical ground of the load 12 is at the same voltage as the earth ground. However, the secondary neutral lead 68 is a conditioned ground which is isolated. External connections such as an isolated/insulated binding post 28 from the chassis 18 may then be coupled to the electrical ground for a conditioned ground.

Figure 6:
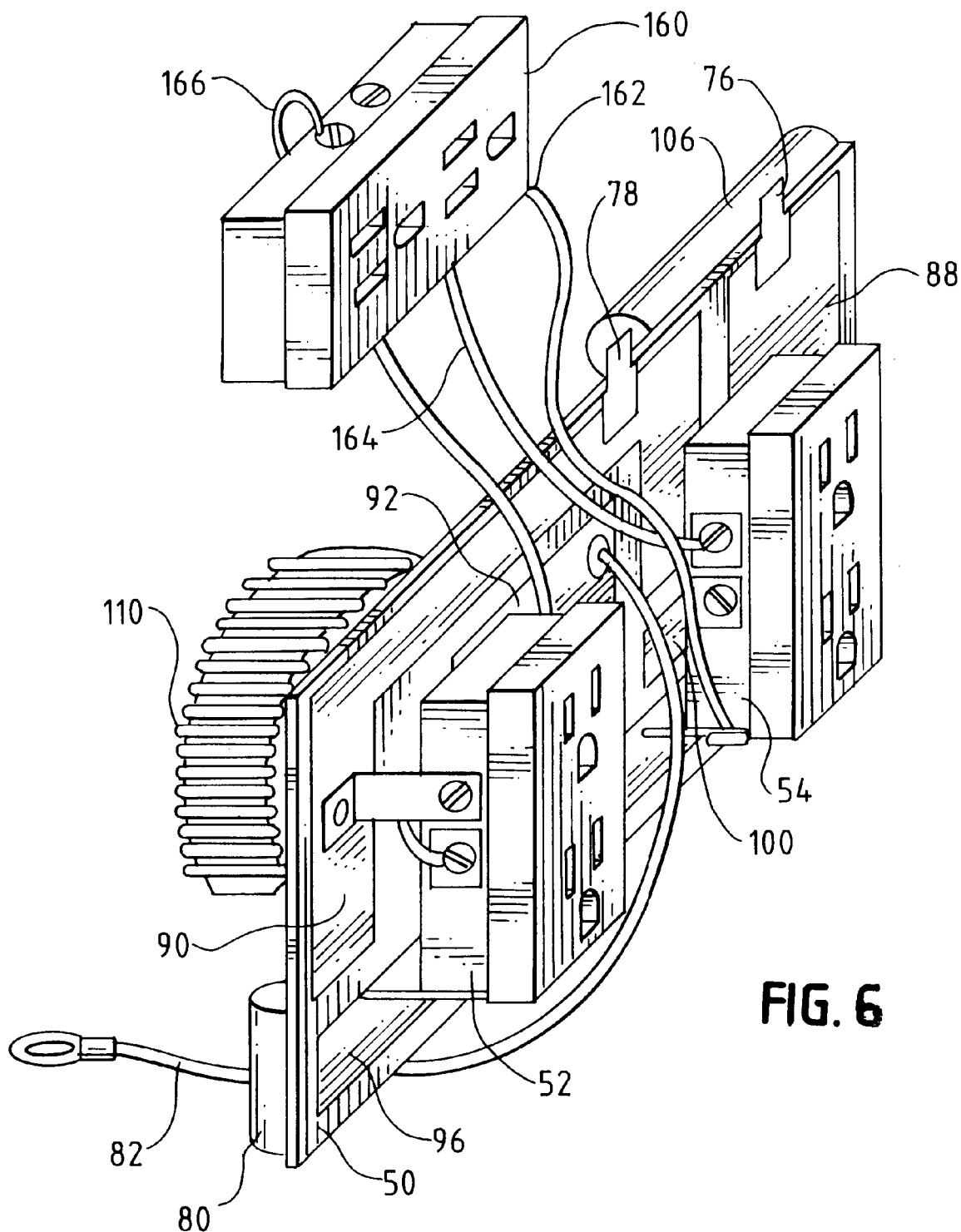
FIG. 6 is a perspective view of a ground isolation circuit board of a second embodiment of the present invention.

The invention may be adapted to different current and voltage requirements by increasing or decreasing the shielding and plate areas on the isolation circuit board 46. Additionally, other connector boxes for further electrical loads may be added. FIG. 6 shows a second embodiment of the present invention which adds a third connector box. Identical elements to those of the isolator power circuit board 46 in FIG. 2 have identical figure numbers. The toroid 110 is proportionally larger than its counterparts in the previous embodiment to provide the proper shielding and isolation for the addition of a third connector box 160. As with the other two connector boxes 52 and 54, the connector box 160 is mounted above the circuit board 46 to maximize shielding and reduce risk of stray voltage jumps.

A ground wire 162 is connected to the ground socket of connector 160. The ground wire 162 is connected to the ground socket of connector box 52 which is in turn electrically coupled to the ground plate 92. A source wire 164 couples the source sockets of the connector box 160 and the connector box 54. A neutral wire 166 couples the neutral sockets of the connector box 160 and the connector box 54. In such a manner all three connector boxes 52, 54 and 160 are coupled common taps to the secondary leads of the isolation transformer 30.

The above described embodiments are merely illustrative of the principles of this invention. Other arrangements and advantages may be devised by those skilled in the art without departing from the spirit and scope of the invention. Accordingly, the invention should be deemed not to be limited to the above detailed description but only by the spirit and scope of the claims which follow.

What is claimed is:

1. An isolated power supply for suppressing high voltage currents from an external three-wire alternating current power source having an earth ground, the isolated power supply having an isolation transformer having a primary and a secondary winding, each of said windings having respective source, neutral and shield leads, said primary leads being electrically coupled to the alternating current power source, said secondary leads being electrically coupled to the electrical load, said secondary shield lead and said primary shield lead being electrically coupled together to the earth ground, comprising:
    isolation means including an inductor, electrically coupled between said secondary neutral lead and the earth ground for maintaining a lowest impedance fault current path through the secondary neutral lead;
    means for attenuating high frequency signals electrically coupled between the earth ground and the secondary neutral lead; and
    means for equalizing potential difference between a load equipment ground and the secondary neutral lead.

2. The power supply of claim 1 in which the isolation means in includes a resistor coupled with the inductor.

3. The power supply of claim 2, in which the inductor is a toroid.

4. The power supply of claim 3, in which the toroid has a number of windings sufficient to attenuate high voltage surges.

5. The power supply of claim 4, in which the attenuating means includes a metal chassis coupled to a ground lead to provide a conductor for attenuating high frequency current.

6. The power supply of claim 4, in which the resistor is coupled in parallel with the torrid.

7. The power supply of claim 6, further including a ferrite bead coupled between the torrid and the electrical load for filtering radiant frequency signals.

8. The power supply of claim 7, including a voltage clamper coupled between the external power source and the ground filter circuit.

9. The power supply of claim 8, in which the voltage clamper is a metal oxide varistor further coupled between the source lead of the secondary winding and the neutral lead of the secondary winding.

10. The power supply of claim 8, including a capacitor coupled between the source lead of the secondary winding and the neutral lead of the secondary winding.

11. The power supply of claim 8, including a capacitor in series with a resistor coupled between the source lead of the secondary winding and the neutral lead of the secondary winding.

12. The power supply of claim 1, in which the isolation means has a resistance of less than 0.5 ohms at frequencies above 1 Khz.

13. The power supply of claim 1, further comprising:
    a first capacitor coupled between the secondary source lead and the secondary neutral lead, and
    a second capacitor in series with a resistor coupled between the secondary source lead and the secondary neutral lead.

14. The power supply of claim 1, further comprising:
    a metallic chassis having a bottom surface and a sidewall, the transformer being mounted on the bottom surface and the earth ground being coupled to the metallic chassis, and a power circuit board having a front and rear surface, the power circuit board being mounted within the chassis between the transformer and the sidewall, the power circuit board being physically separated from the transformer.

15. The power supply of claim 14, including at least one isolated electrical connector offset from the front surface of the circuit board, said at least one isolated electrical connector mounted on the sidewall, the electrical outlet being electrically connected to the secondary windings of the transformer.

16. The power supply of claim 15 wherein said circuit board further comprises:

a source plate embedded within said circuit power board and electrically connected to the secondary lead of the transformer, a neutral plate embedded within the power circuit board and electrically connected to the neutral lead of the transformer, a ground plate embedded within the power circuit board and electrically connected to the safety ground, and wherein the ground plate, neutral plate and the source plate are separated by each other by a distance sufficient to prevent high voltage arcing.

* * * * *